United States Patent [19]

Kuwabara et al.

[11] Patent Number: 4,885,066
[45] Date of Patent: Dec. 5, 1989

[54] ELECTROLYTIC FINISHING METHOD

[75] Inventors: Youhei Kuwabara, Fukuroi; Teruo Asaoka, Kakegawa, both of Japan

[73] Assignee: Shizuoka Seiki Co., Ltd., Fukuroi, Japan

[21] Appl. No.: 245,422

[22] Filed: Sep. 16, 1988

[30] Foreign Application Priority Data

Sep. 17, 1987 [JP] Japan .................................. 62-233518
Sep. 17, 1987 [JP] Japan .................................. 62-233519

[51] Int. Cl.$^4$ ........................... B23H 3/02; B23H 7/18
[52] U.S. Cl. ............................. 204/129.43; 204/129.5; 204/DIG. 009; 204/129.7
[58] Field of Search ..... 204/129.43, 129.5, DIG. 009, 204/129.7

[56] References Cited

U.S. PATENT DOCUMENTS

| | | | |
|---|---|---|---|
| 3,527,686 | 9/1970 | Inoue | 204/224 |
| 3,607,689 | 9/1971 | Inoue | 204/143 |
| 4,097,710 | 6/1987 | Maillet | 204/129.43 X |
| 4,160,710 | 7/1979 | Greenwood | 204/DIG. 009 |
| 4,720,616 | 1/1988 | Inoue | 204/129.43 X |
| 4,800,006 | 1/1989 | Kuwabara et al. | 204/DIG. 009 |

Primary Examiner—Donald R. Valentine
Attorney, Agent, or Firm—Armstrong, Nikaido, Marmelstein, Kubovcik & Murray

[57] ABSTRACT

An electrode is positioned to form a predetermined gap between the electrode and a surface of a work, and the electrode and the work are submerged in an electrolyte. Thereafter pulses are applied to the electrode and clean electrolyte is supplied to the gap. The pulse application is performed by a pulse having a peak current density between 30 A/cm$^2$ and 50 A/cm$^2$ and a pulse duration between 2 msec and 10 msec.

6 Claims, 11 Drawing Sheets

| MACHINING EXAMPLE | CURRENT DENSITY (A/cm²) | | PULSE DURATION (msec) | NUMBER OF PULSES | TOTAL QUANTITY OF ELECTRICITY (C/cm²) | SURFACE ROUGHNESS (µm) | | FINISHED SURFACE |
|---|---|---|---|---|---|---|---|---|
| | PEAK | AVERAGE | | | | BEFORE MACHINING | AFTER MACHINING | |
| 1 | 32 | 30 | 5 | 5 | 500 | 20 | 8 | SMOOTH SURFACE |
| 2 | 40 | 38 | 3 | 5 | 500 | 90 | 5 | 〃 |
| 3 | 40 | 34 | 5 | 5 | 500 | 21 | 1.4 | 〃 |
| 4 | 40 | 34 | 9 | 5 | 500 | 25 | 4 | 〃 |
| 5 | 40 | 26 | 20 | 5 | 475 | 86 | 44 | LUSTROUS SURFACE |
| 6 | 40 | 30 | 40 | 1 | 500 | 83 | 63 | 〃 |
| 7 | 48 | 48 | 3 | 5 | 442 | 61 | 8 | SMOOTH SURFACE |
| 8 | 48 | 45 | 5 | 5 | 500 | 16 | 3 | 〃 |
| 9 | 48 | 41 | 40 | 1 | 500 | 82 | 30 | LUSTROUS SURFACE |

NUMBER OF PULSES : PULSE SUPPLIED TILL FLUSHING OCCURS

FIG. 6

FIG. 7a
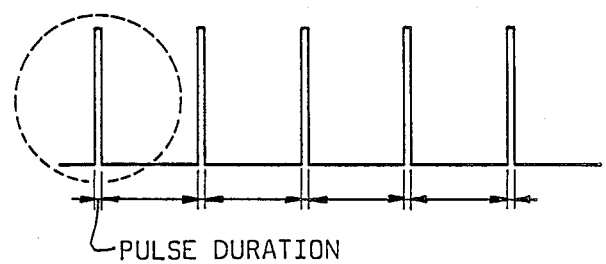
PULSE DURATION
FIG. 7b
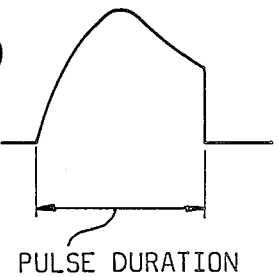
PULSE DURATION
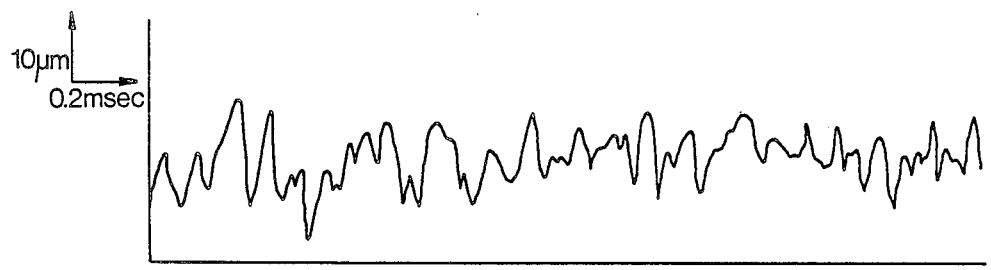
FIG. 8a
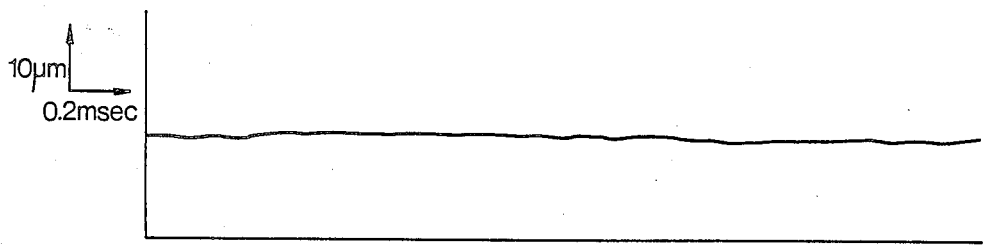
FIG. 8b

ELECTROLYTIC FINISHING METHOD

BACKGROUND OF THE INVENTION

The present invention relates to a method for finishing a surface of a work by electrolytic machining, and more particularly to a method for finishing the surface having a three-dimensional shape.

U.S. Pat. Nos. 3,527,686 and 3,607,689 disclose electrolytic machines. In the machine liquid electrolyte is continuously passed between an electrode and a work at a high speed during machining, so that residual products such as particles of eroded metal from the work, hydrogen gas, and others are discharged from the gap between the electrode and the work. However, in the case of the work having a complicated three-dimensional shaped recess, it is impossible to pass the liquid electrolyte through the gap having a complicated shape at a constant speed. The accuracy of the product is greatly influenced by the irregularities in the electrolyte flow. In addition, the concentration of the electrolyte at an outlet of an electrolyte tank is different from the concentration at an inlet, even if the pressure of the liquid is increased. Accordingly, it is impossible to produce accurate products.

SUMMARY OF THE INVENTION

The object of the present invention is to provide an electrolytic finishing method which may finish a three-dimensional surface of a work to a product having a lustrous surface with accuracy at high speed.

According to the present invention, there is provided a method for finishing a work including securing the work in an electrolyte tank, positioning an electrode to form a predetermined gap between the electrode and the surface of the work, supplying electrolyte to the electrolyte tank so as to submerge the electrode and the work, applying pulses to the electrode, supplying clean electrolyte to the gap and discharging the electrolyte including residual products, characterized in that a pulse having a peak current density between 30 A/cm$^2$ and 50 A/cm$^2$ and a pulse duration between 2 msec and 10 msec is applied at each pulse application.

In an aspect of the invention, the pulse application is divided into an early period and a later period, and the pulse duration in the later period is more than 2 times that of the early period.

The other objects and features of this invention will be apparently understood from the following description with reference to the accompanying drawings.

BRIEF DESCRIPTION OF DRAWINGS

FIG. 6 shows a list of examples of machining method;

FIG. 7a shows waveforms of pulses;

FIG. 7b shows an enlarged waveform of a pulse;

FIGS. 8a and 8b show graphs of surface roughness of the work before finishing machining and after finishing machining, respectively.

DETAILED DESCRIPTION OF THE PREFERRED EMBODIMENT

Figure 1:
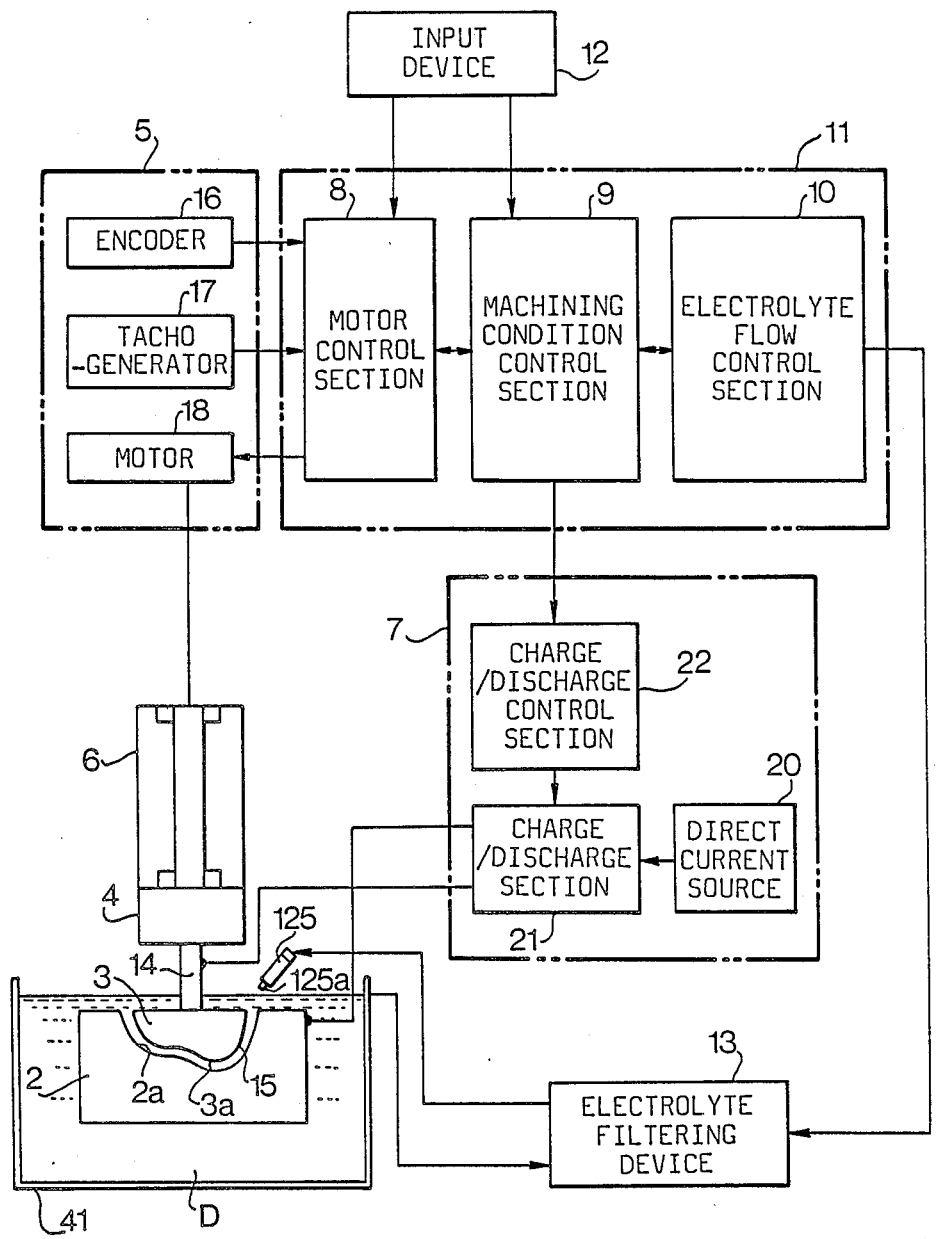
FIG. 1 is a schematic illustration showing a system of an electrolytic finishing machine according to the present invention.

Referring to FIG. 1, the electrolytic finishing machine 1 has a work 2 mounted on work fixing device (not shown) in an electrolyte tank 41. An electrode 3 made of copper is secured to the lower end of a rod 14 of an electrode holding device 4. The holding device 4 is operatively connected to an electrode driving device 5 through an electrode driving direction converter 6. The converter 6 is arranged to change rotary output of a motor 18 in the device 5 into axial movement of the rod 14.

The work 2 has a three-dimensional recess 2a to be finished, which has been formed by an electrical discharge machine (not shown) with the electrode 3.

The driving device 5 has a rotary encoder 16, tacho-generator 17 and motor 18. Output signals of the encoder 16 and tacho-generator 17 are supplied to a motor control section 8 of a control unit 11, and motor 18 is operated by a control signal from the motor control section 8. The control unit 11 has a machining condition control section 9 and an electrolyte flow control section 10.

The system has a power source device 7 which comprises a direct current source 20, a charge/discharge section 21, and a charge/discharge control section 22 for controlling the charge/discharge section 21. The charge/discharge section 21 generates a pulse of a current density (specifically means "average current density") for a pulse duration dependent on the surface area of the recess 2a, in response to signals from the machining condition control section 9.

The system further has an input device 12 for inputting machining conditions, and an electrolyte filtering device 13 which will be described hereinafter in detail.

The input device 12 is arranged to input various machining condition signals such as material of the work, surface area of the work, machining depth, grades of dimension accuracy, surface roughness, and dimension of a gap 15 between the electrode and the work. The signals are fed to the motor control section 8 and the machining condition control section 9.

Figure 2A:
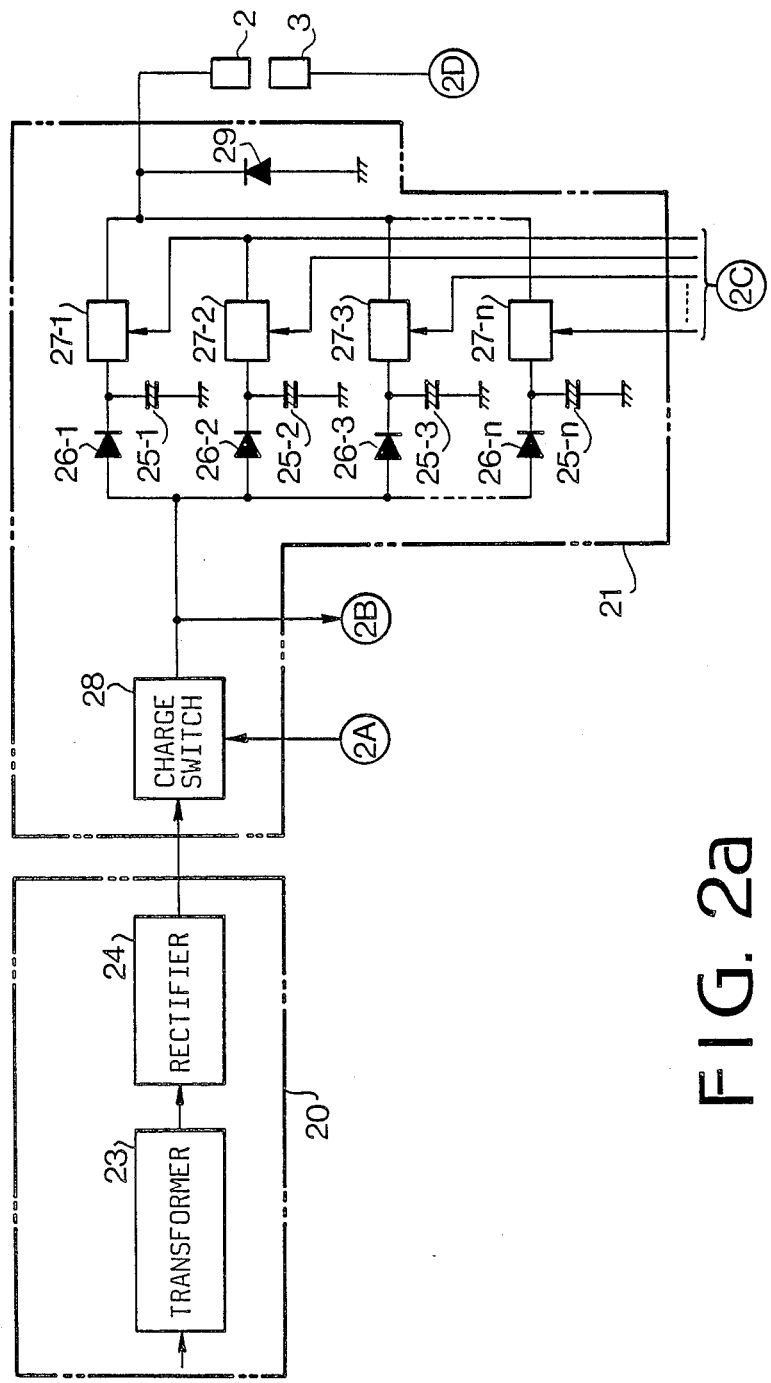
FIGS. 2a and 2b are block diagrams showing a system for supplying current to an electrode and a work.
Figure 2B:
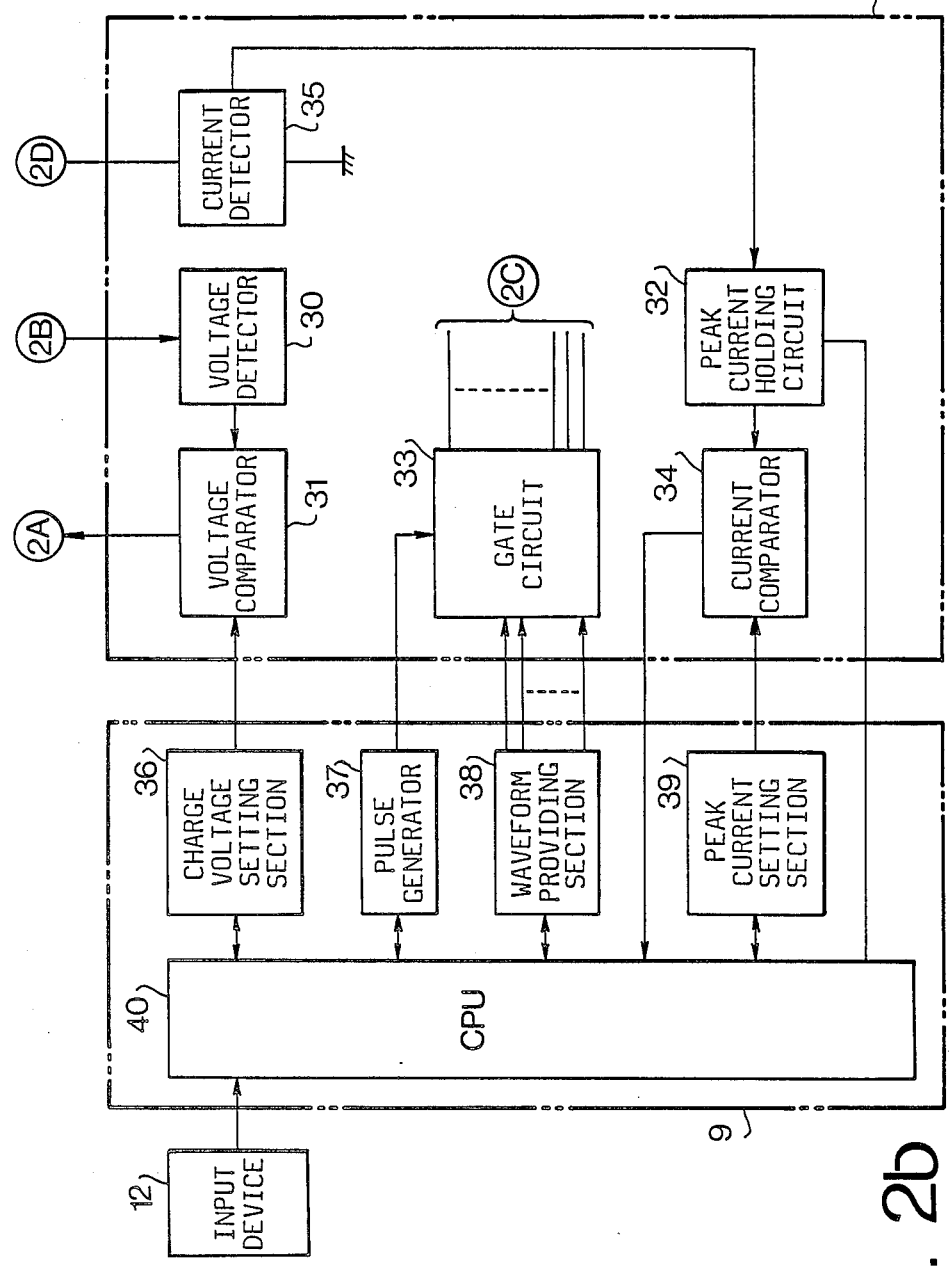

Referring to FIGS. 2a and 2b, the machining condition control section 9 comprises CPU 40 applied with signals from the input device 12 to calculate machining and others, a waveform providing section 38 for providing current waveform discharged in the gap 15 between the work 2 and the electrode 3, a pulse generator 37 for generating pulses each having a predetermined pulse duration, a charge voltage setting section 36 for setting charge voltage applied to the capacitors 25-1 to 25-n, and a peak current setting section 39 for setting a predetermined peak current. The direct current source 20 comprises a transformer 23 and a rectifier 24.

The charge/discharge section 21 has a plurality of capacitors 25-1 to 25-n which are connected in parallel with each other, diodes 26-1 to 26-n for preventing reverse current to the current source, switches 27-1 to 27-n for generating pulses, and a charge switch 28 responsive to a signal from a voltage comparator 31 for connecting the direct current source 20 to capacitors 25-1 to 25-n to charge each capacitor to a set value.

The charge/discharge control section 22 comprises a voltage detector 30 for detecting charge voltage applied to the capacitors 25-1 to 25-n, and voltage comparator 31 for comparing a set voltage set at charge voltage setting section 36 in the machining condition control section 9 with the charge voltage detected by the voltage detector 30. The control section 22 further comprises a current detector 35 for detecting current of the electric charge discharged between the work 2 and the electrode 3, a peak current holding circuit 32 for holding a peak current detected in the detector 35, a current comparator 34 for comparing the peak current from the peak current holding circuit 32 with the peak set current supplied from peak current setting section 39 in the control section 9, and a gate circuit 33 for supplying an operation signal to switches 27-1 to 27-n in response to signals from pulse generator 37 and waveform providing section 38. There is provided a diode 29 for preventing the switches 27-1 to 27-n from breaking down by reverse current.

In response to a signal supplied from the input device 12, which represents the surface area of the work 2, the CPU 40 calculates a charge voltage based on a datum from a memory. The charge voltage is determined to have a predetermined peak current density in a supplied pulse. A charge voltage signal corresponding to the calculated charge voltage is fed to the charge voltage setting section 36 and a peak current density signal is fed to the peak current setting section 39. An output signal of the section 39 is applied to the current comparator 34.

When the pulse current flows between the work 2 and the electrode 3, the current is detected by the current detector 35 and a peak current thereof is preserved in the peak current holding circuit 32. The current comparator 34 compares the peak current from the section 39 with the peak current from the circuit 32 and produces a compared signal which is supplied to the CPU 40. In accordance with the signal, the CPU 40 controls the charge voltage set at the section 36 so as to maintain the peak current density at a predetermined value.

Figure 3A:
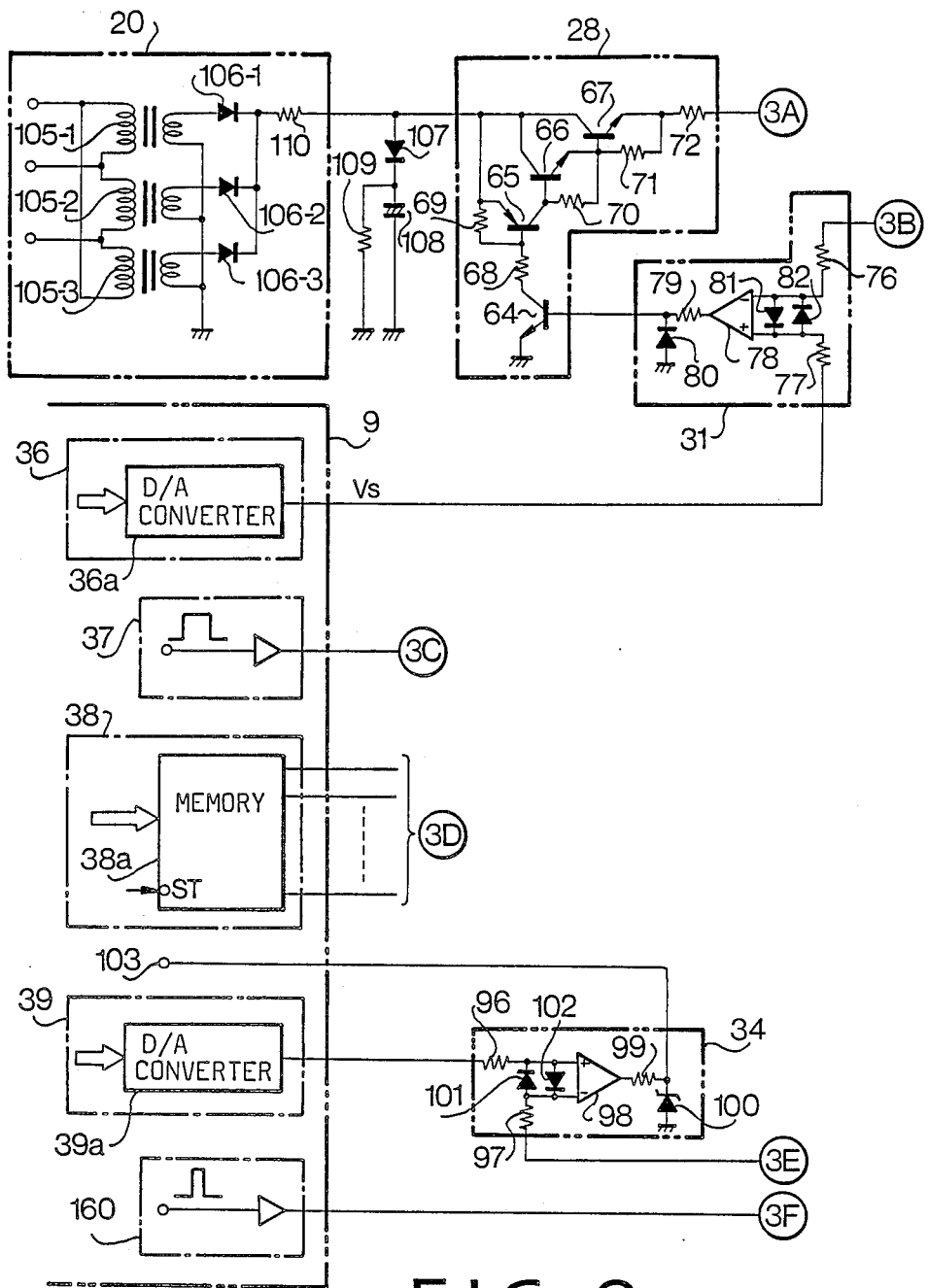
FIGS. 3a and 3b show circuits of the system of FIG. 2.
Figure 3B:
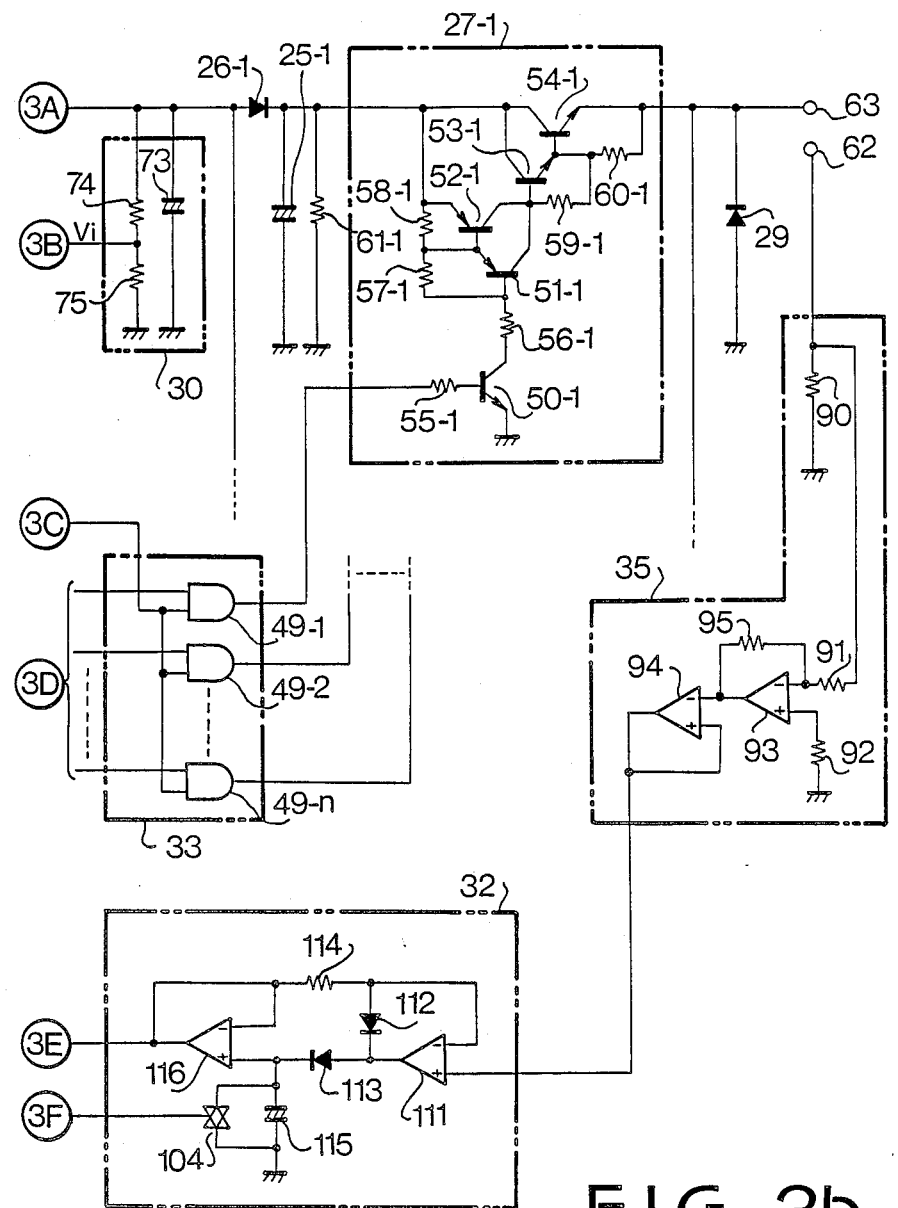

Referring to FIGS. 3a and 3b showing circuits of the system, the direct current source 20 has coils 105-1 to 105-3 for reducing voltage to a predetermined value, and diodes 106-1 to 106-3 for rectifying the current so as to produce a direct current. The direct current is applied to the charge switch 28 through a resistor 110.

The charge switch 28 comprises four transistors 64 to 67 and five resistors 68 to 72. The base of transistor 64 is connected to the voltage comparator 31. The transistors 64 to 67 are controlled in response to the signal from the comparator 31, such that a predetermined charge voltage is applied to the capacitors 25-1 to 25-n through the diodes 26-1 to 26-n.

A diode 107 is connected between the source 20 and the switch 28 for protecting the switch 28. A cathode of the diode 107 is connected to the ground through a capacitor 108 and a resistor 109.

The voltage comparator 31 has a comparator 78 applied with a set charge voltage Vs from a D/A converter 36a of the charge voltage setting section 36 through a resistor 77, and a detected charge voltage Vi from the voltage detector 30 through a resistor 76 for comparing voltages Vs with Vi. Diodes 81 and 82 are connected between inputs of the comparator 78. An output signal of the comparator 78 is applied to the base of the transistor 64 through a resistor 79 and a diode 80 which is connected to the ground.

The voltage detector 30 connected between the switch 28 and the capacitors 25-1 to 25-n for detecting charge voltage applied to the capacitors has a capacitor 73 and resistors 74 and 75 connected in series each other and connected to the capacitor 73 in parallel. A charge voltage Vi divided across the resistors is applied to the comparator 78 in the voltage comparator 31.

The gate circuit 33 has AND gates 49-1 to 49-n connected to a temporary memory 38a of the waveform providing section 38 and an output terminal of the pulse generator 37. The AND gates 49-1 to 49-n are connected to the switches 27-1 to 27-n of the charge/discharge section 21 for controlling the discharge of the capacitors 25-1 to 25-n.

Since each of the switches 27-1 to 27-n, capacitors 25-1 to 25-n, and diodes 26-1 to 26-n in the section 21 has the same structure, the structure of the switch 27-1, capacitor 25-1 and diode 26-1 will be described hereinafter. The switch 27-1 comprises five transistors 50-1 to 54-1 and six resistors 55-1 to 60-1. The transistor 50-1 is connected to the AND gate 49-1 of the gate circuit 33 through the resistor 55-1. The transistors 50-1 to 54-1 are sequentially turned on in response to the signal from the AND gate 49-1 to discharge the capacitor 25-1. Thus, the current is fed to terminals 62 and 63 for the electrode 3 and the work 2, respectively. Numeral 61-1 designates a resistor connected to the capacitor 25-1 in parallel.

The current detector 35 is connected to the terminal 62 through a resistor 90 which is connected to the ground. The terminal 62 is further connected to one of inputs of an amplifier 93 through a resistor 91 and the other input of the amplifier 93 is connected to the ground through a resistor 92. An output of the amplifier 93 is connected to one of inputs of an amplifier 94, to which the input of the amplifier 93 is connected through a resistor 95. The output of the amplifier 94 is connected to the peak current holding circuit 32 for supplying a detected discharge current.

The peak current holding circuit 32 comprises an amplifier 111, one of inputs of which is connected to an output thereof through a diode 112. The other input is applied with the signal from the amplifier 94. The input of the amplifier 111 is connected to one of inputs of an amplifier 116 through a resistor 114. The output of the amplifier 111 is connected to the other input of the amplifier 116 through a diode 113. A capacitor 115 connected to the ground is connected to the other input of the amplifier 116. Across the capacitor 115, an analog switch 104 is connected, to which a reset pulse generator 160 in the CPU 40 is connected. A peak current signal is applied to the current comparator 34 and the peak current is reset by a reset pulse from the generator 160.

The current comparator 34 comprises a comparator 98 connected to the output of the amplifier 116 through a resistor 97 and applied with a signal from a D/A converter 39a of the peak current setting section 39 through a resistor 96. Diodes 101 and 102 are connected between the comparator 98 and resistors 96 and 97. An output of the comparator 98 is connected to a resistor 99 which is in turn connected to a constant voltage diode 100 connected to the ground, and to an input terminal 103 of the CPU 40 for the controlling charge voltage in the charge voltage providing section 36.

Figure 4:
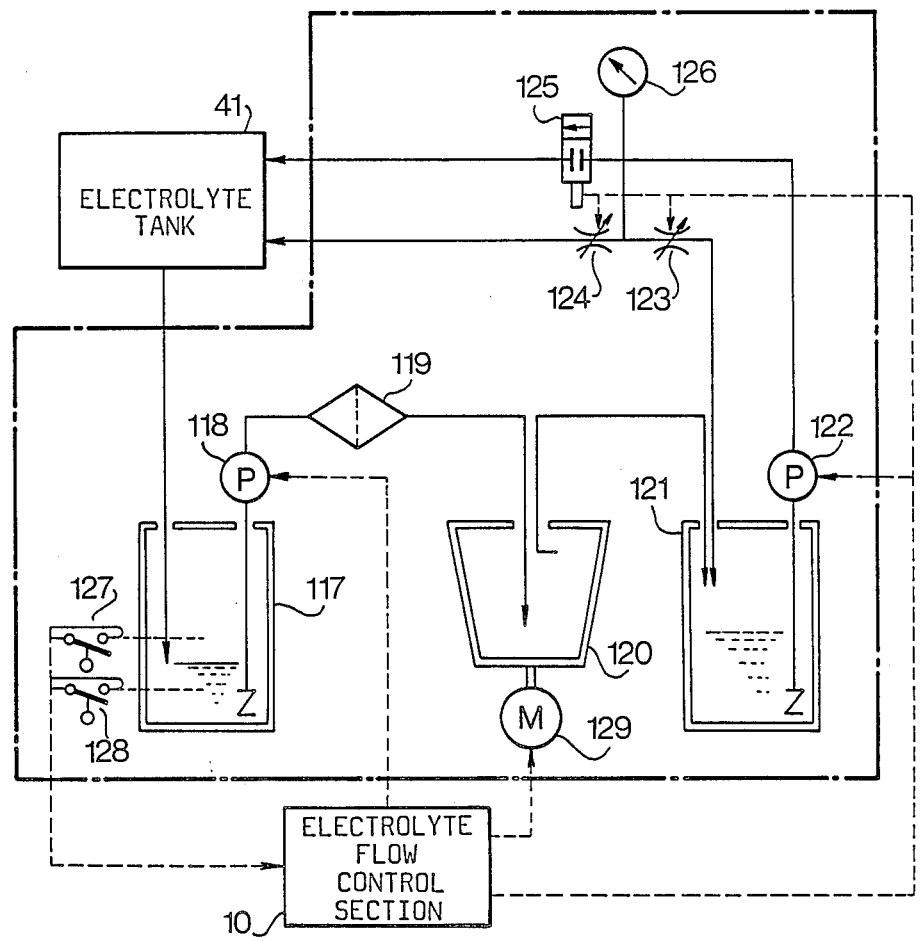
FIG. 4 is a block diagram showing a filtering system for liquid electrolyte.

Referring to FIG. 4, the electrolyte filtering device 13 comprises a dirty tank 117 for receiving electrolyte including residual products, which is removed from the electrolyte tank 41, a centrifugal separator 120 which is driven by a motor 129 to separate the electrolyte fed through a filter 119 from the dirty tank 117 by a pump 118, clean tank 121 storing clean electrolyte fed from the centrifugal separator 120, a pump 122 for feeding the electrolyte in the clean tank 121 to the electrolyte tank 41 through a solenoid operated valve 125, flow metering valves 123 and 124 for adjusting the pressure of electrolyte fed to the tank 41, and a pressure gauge 126. As shown in FIG. 1, the valve 125 has a nozzle 125a oriented to the gap 15. A pair of float switches 127 and 128 are provided for providing an upper and lower limits of electrolyte levels in the dirty tank 117.

The electrolyte flow control section 10 is arranged to control the flow metering valves 123 and 124 to keep the pressure constant and to control the solenoid operated valve 125 in response to signals from the machining condition control section 9.

Figure 5A:
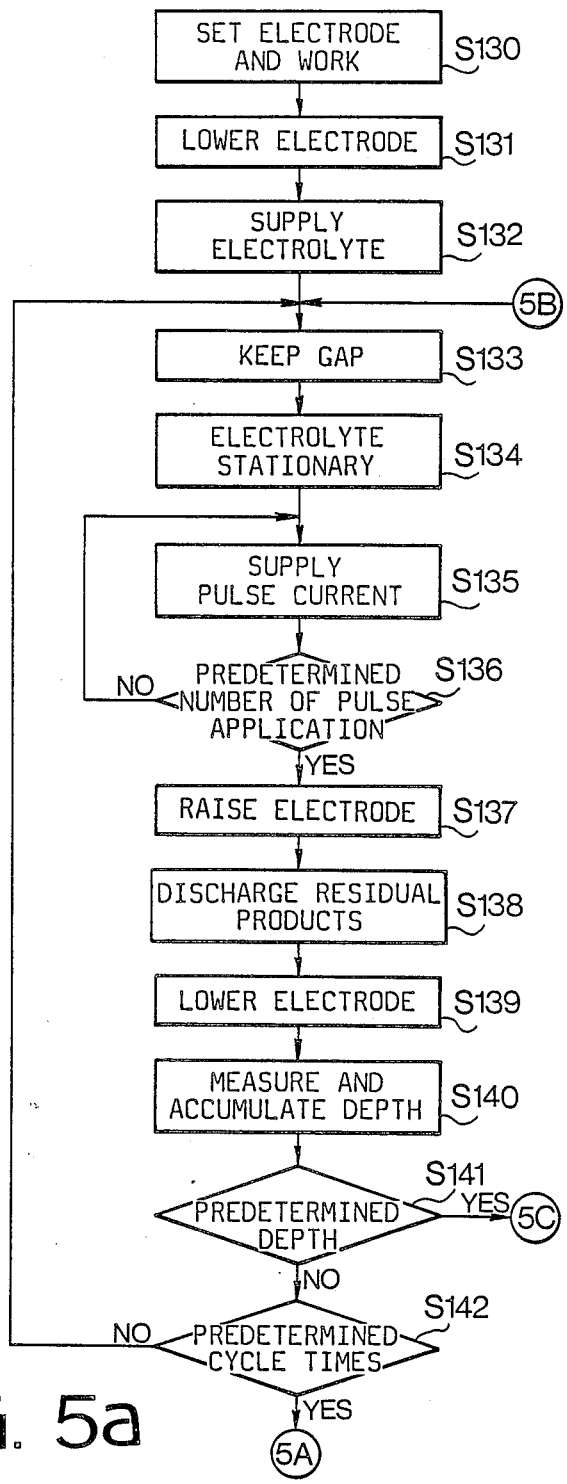
FIGS. 5a and 5b are flow charts showing an operation of machining method.
Figure 5B:
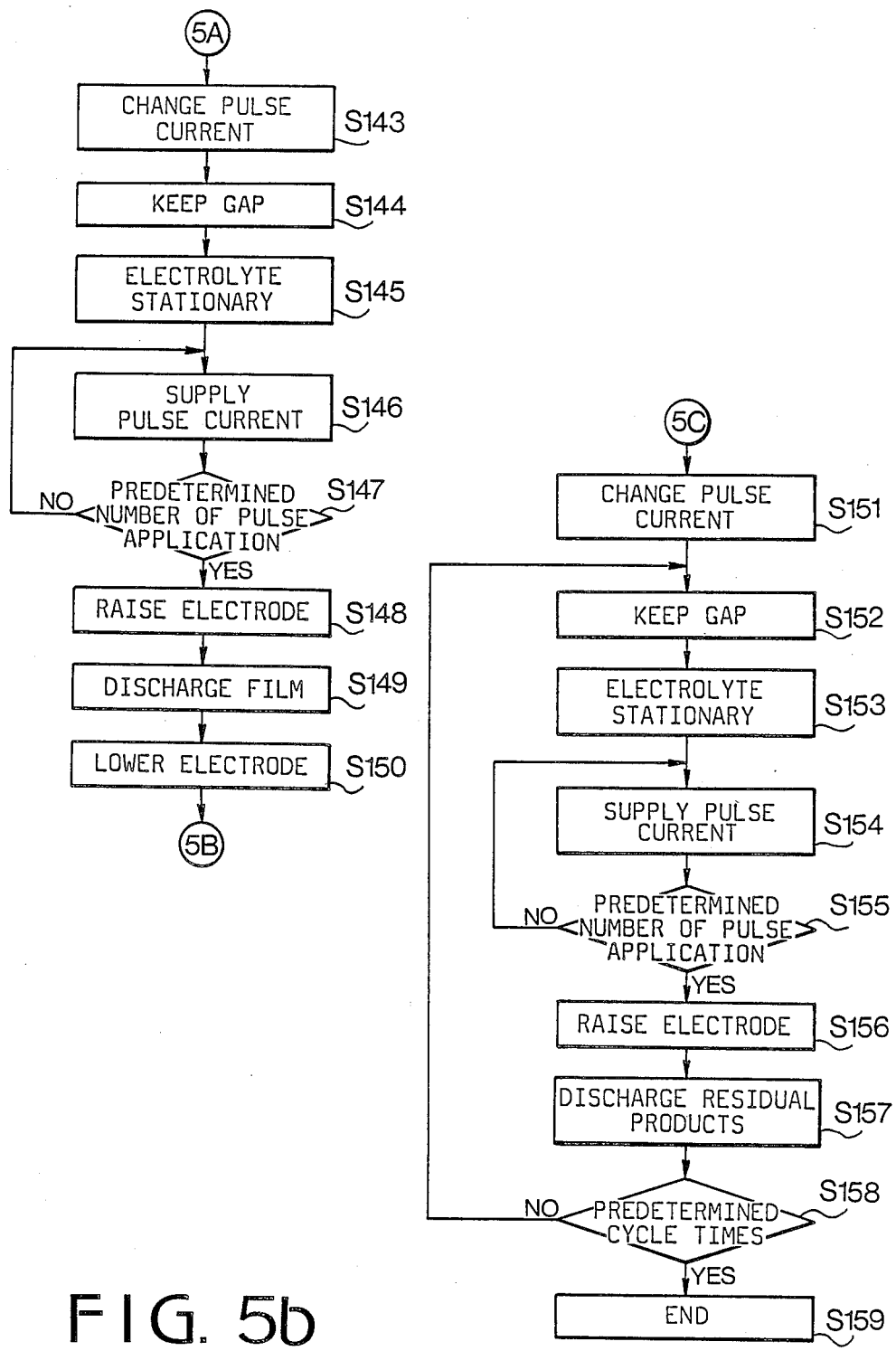

The machining method of the work is described hereinafter with reference to the flow charts of FIGS. 5a and 5b. The electrode 3 is attached to the rod 14. The position of the work 2 is adjusted by operating X and Y tables (not shown) to align the recess 2a with an electrode surface 3a (step 130). The electrode 3 is lowered by the driving device 5 to contact the work 2 (step 131) and the position of the electrode is stored in a memory in the CPU as an original position A. Electrolyte D (FIG. 1) is supplied to the tank 41 (step 132), and thereafter, the electrode 3 is raised to provide a predetermined initial gap (step 133). When the electrolyte in the gap becomes stationary (step 134), the electrolytic machining is started. A predetermined finishing pulse current for improving the surface roughness of the work is applied to the electrode 3 by the power source device 7 in response to the signal from the machining condition control section 9 (step 135). By the electrolytic process, projections on the surface of the recess 2a are eroded, so that the height of each projection may be reduced.

After a predetermined number of pulses are applied (step 136), the electrode 3 is raised by the motor 18 to expand the gap (step 137). If the predetermined pulses are not applied, the process returns to the step 135. The electrolyte in the tank 41 is discharged to the dirty tank 117 together with residual products such as particles of eroded metal and hydrogen gas. At the same time as the discharge or after the discharge, the solenoid operated valve 125 is opened to inject clean electrolyte from the clean tank to the gap 15, thereby removing the residual products from the gap and the tank 41 (step 138).

After the discharge of the electrolyte, the electrode 3 is lowered to contact the recess 2a (step 139) and the position of the electrode 3 is stored in the memory in the CPU. The stored position is compared with the original position A in the control unit 11, so that the machining depth per one machining cycle (at every one or more pulses) is measured and accumulated (step 140). It is determined whether the difference between the sum of machining depth and the input depth becomes a predetermined value with respect to the input depth (for example 1 μm), or not (step 141). If not, it is determined whether a predetermined time of machining cycles is performed or not (step 142). If the machining cycles are not completed, the program returns to the step 133. Thus, the above described machining (steps 133 to 141) is repeated in accordance with signals from the control unit 11.

When the machining cycle is repeated predetermined times (step 142), the CPU 40 applies a pulse change signal to the waveform providing section 38, so that the finishing pulse is changed to a removing pulse for removing a film including electrolytic products formed on the work 2, before the electrode 3 is raised (step 143). Thereafter, the electrode 3 is raised to provide the predetermined gap (step 144). After electrolyte becomes stationary (step 145), one or more removing pulses are applied to the electrode 3 (step 146) to remove the film (step 147). Then the electrode 3 is raised (step 148), and clean electrolyte is injected from the nozzle 125a to discharge the electrolyte in the gap 15, while the electrolyte in the tank 41 is discharged together with the film (step 149). The removing pulse current is again changed into the finishing pulse current for improving the surface roughness and the electrode 3 is lowered again (step 150), and the program returns to the step 133.

When the difference between the sum of machining depths and the desired depth becomes smaller than a predetermined value (step 141), the finishing pulse is changed to a fine fining pulse for finishing the work to a lustrous surface (step 151). In the later period, a fine finishing pulse having a longer pulse duration than the finishing pulse in the early period at the step 135. With the fine finishing pulse current, electrolytic machining processes 152 to 157 which are the same as the above described machining processes 133 to 138 are performed predetermined times (step 158), so that finishing machining is completed (step 159).

Although the pulse change timing is detected by machining depth in the above method, it can also be detected by calculating the accumulated amount of the current in coulomb until the machining ends.

If electrolyte injecting nozzles are provided on an end of the electrode 3, it is not necessary to raise the electrode at the residual products removing process.

During the machining, if a film is not produced on the recess 2a, operational steps for supplying removing pulses for removing the film can be omitted.

The operation of the electrolyte filtering device 13 will be described hereinafter. The level of the electrolyte in the dirty tank 117 is detected by float switches 127 and 128, and the detected level signal is applied to the electrolyte flow control section 10. When the level is between the switches, the control section 10 produces a signal which operates the pump 118 to transfer the electrolyte to the centrifugal separator 120 through filter 119. The centrifugal separator 120 is operated by the motor 129 to separate the residual products from the electrolyte. The clean electrolyte is stored in the clean tank 121. The electrolyte in the tank 121 is injected from the valve 125 to the tank 41 and supplied to the tank through the flow metering valve 124 as described above.

The pressure of liquid electrolyte supplied from the valve 124 is kept constant as described below. When the pressure measured by the pressure gauge 126 is lower than a set value of the electrolyte flow control section 10, the opening degree of the flow metering valve 124 is increased and the opening degree of the valve 123 in a return line is reduced, thereby increasing the pressure of the electrolyte supplied to the tank 41. When the measured pressure is higher than the set value, the opening degree of valve 124 is reduced and the opening degree of the valve 123 is increased. By keeping the pressure of electrolyte supplied to the tank 41 constant, conditions of electrolyte, for example consumed time until the surface of the electrolyte becomes smooth, are maintained constant. Thus, the work is finished in high quality. As described above, the solenoid operated valve 125 injects the electrolyte into the gap 15 to remove the residual products in the gap together with the electrolyte.

FIG. 6 shows a list of examples for machining method taken place in the following conditions.

Electrode: Copper
Stock: Tool Steel
Surface area of the work: 25 cm$^2$
Gap: 0.1 mm
Electrolyte : Sodium nitrate (concentration of 40%)

FIGS. 7a and 7b show preferable pulse current waveforms employed in the examples, in which a pulse interval is about 250 msec.

In machining examples 1 to 4, 7 and 8, a pulse having a peak current density between 32 A/cm$^2$ and 48 A/cm$^2$, and a pulse duration between 3 msec and 7 msec is applied. As a result, surface roughness of the work shown by a graph of FIG. 8a is remarkably improved to that shown by a graph of FIG. 8b (which shows a result of the example 3). The work is finished to a smooth surface.

Figure 9A:
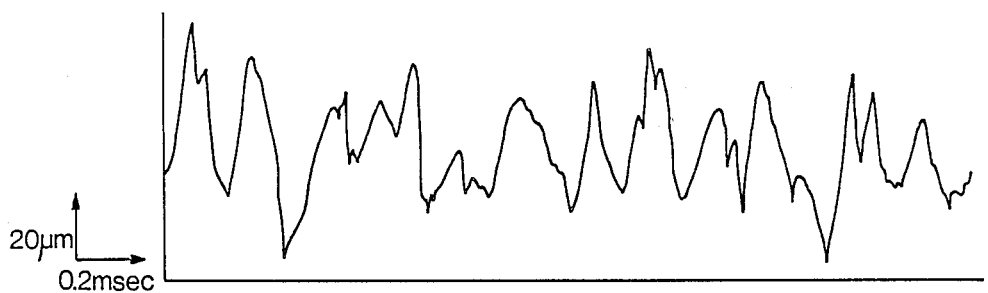
FIGS. 9a and 9b show another example of FIGS. 8a and 8b.
Figure 9B:
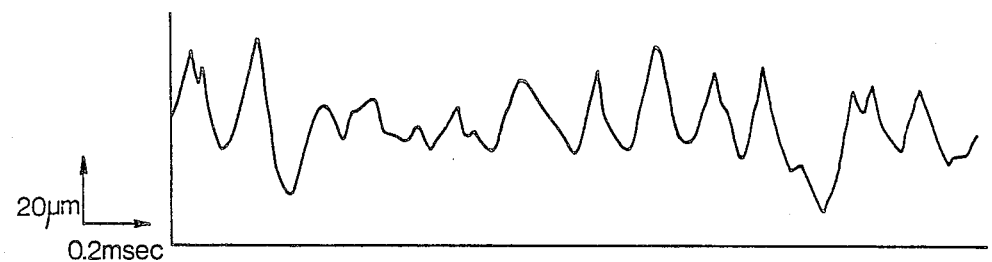

In machining examples 5, 6 and 9, a pulse having a peak current density of 40 A/cm$^2$ or 48 A/cm$^2$, and a pulse duration of 20 msec or more is applied. As a result, as shown in FIGS. 9a and 9b, the surface is finished to a lustrous surface without deteriorating the surface of the work.

If the peak current density of 30 A/cm$^2$ or less is used, a thick oxide film is formed on the surface of the work. If the peak current density exceeds 50 A/cm$^2$, the surface texture of the work is unfavourably changed.

In the examples of FIG. 6, total quantity of electricity for each of the machinings is about 500 C/cm$^2$. Even if the quantity of electricity less than the examples is applied, the same result as shown in FIG. 6 can be obtained.

Thus, by setting the pulse peak current density to a value between 30 A/cm$^2$ and 50 A/cm$^2$ and the pulse duration to a value between 2 msec and 10 msec, it is possible to produce a work surface having a fine quality within a small width of the current density.

Since a lustrous surface can be produced by increasing the pulse duration, a pulse for improving the surface roughness is applied in an early period of machining and a pulse having a longer pulse duration for forming a lustrous surface is applied in a later period of machining without changing the current density. Since only the pulse duration is changed, changing operation of the pulse current is easily performed. Thus, it is possible to obtain a high quality lustrous surface of the work at a high speed.

Following is a result of finishing machining which is performed under the above described conditions for examples shown in FIG. 6.

In the early period (Example 3)
Current density: 40 A/cm$^2$
Pulse duration: 5 msec
In the later period (Example 9)
Current density: 48 A/cm$^2$
Pulse duration: 40 msec
Finished surface roughness: Less than 1 μm
Finished surface: Lustrous surface Although, the peak current density for improving the surface roughness is changeable dependent on the material of the work, it is preferable to apply a pulse having a longer pulse duration and a higher peak current density within the above described ranges. Further, if a pulse current having a short pulse duration is applied, it is not necessary to discharge the electrolytic products from the tank at every cycles, since the amount of the electrolytic products produced at one cycle is small.

In accordance with the present invention, a pulse having a peak current density between 30 A/cm$^2$ and 50 A/cm$^2$, and a pulse duration between 2 msec and 10 msec is applied for obtaining a fine surface roughness of the work. Then, a pulse having a pulse duration between 20 msec and 60 msec, with the same peak current density is applied, so that the work having a three-dimensional surface can be finished to a lustrous surface with accuracy at a high speed. Since the quality of the surface of the work is not deteriorated during the machining, it is possible to improve the quality of the surface of the work. Waste water treatment of electrolyte including electrolytic products is easily performed at a low cost.

The present invention can be used for finishing works other than the metal work, such as silicon single crystal for manufacturing semiconductors, gallium aersenide stock, and others.

While the presently preferred embodiment of the present invention has been shown and described, it is to be understood that this disclosure is for the purpose of illustration and that various changes and modifications may be made without departing from the spirit and scope of the invention as set forth in the appended claim.

What is claimed is:

1. A method for finishing a work comprising the steps of:
    securing the work in an electrolytic tank;
    positioning an electrode to form a predetermined gap between the electrode and the surface of the work;
    supplying electrolyte to the electrolyte tank so as to submerge the electrode and the work;
    applying pulses to the electrode;
    supplying clean electrolyte to the gap and discharging the electrolyte including residual products;
    setting a reference peak current density between 30 A/cm$^2$ and 50 A/cm$^2$;
    applying a pulse having a pulse duration between 2 msec and 10 msec at each pulse application to the electrode; and
    controlling the peak current of the pulse to the reference peak current.

2. The method according to claim 1 wherein the supply of clean electrolyte is performed after one pulse application.

3. The method according to claim 1 wherein the supply of clean electrolyte is performed after a plurality of pulse applications.

4. The method according to claim 1 wherein the pulse application is divided into an early period and a later period, and the pulse duration in the later period is more than 2 times that of the early period.

5. The method according to claim 4 wherein the peak current density of the pulse and the pulse duration in the early period are between 30 A/cm$^2$ and 50 A/cm$^2$ and between 2 msec and 10 msec, respectively.

6. The method according to claim 4 wherein the peak current density of the pulse and the pulse duration in the later period are between 30 A/cm$^2$ and 50 A/cm$^2$ and between 20 msec and 60 msec.

* * * * *